Patented July 10, 1934

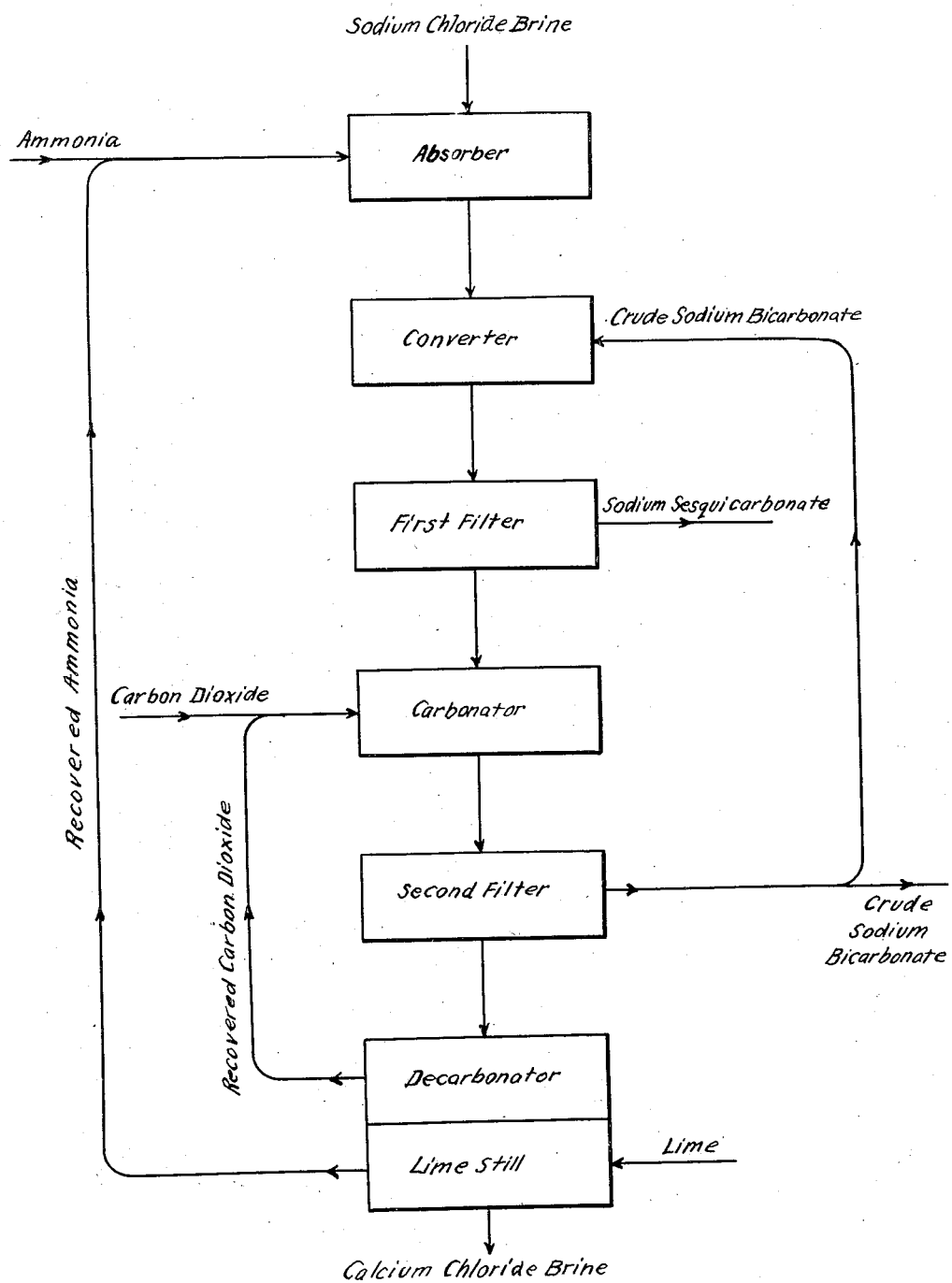

1,966,114

UNITED STATES PATENT OFFICE 1,966,114

IMPROVEMENT IN THE PRODUCTION OF SODIUM SESQUICARBONATE

George Lewis Cunningham and Robert B. MacMullin, Niagara Falls, N. Y., assignors to The Mathieson Alkali Works, Inc., New York, N. Y., a corporation of Virginia Application September 17, 1932, Serial No. 633,562

5 Claims. (Cl. 23—63)

This invention relates to improvements in the production of sodium sesquicarbonate,

$$NaHCO_3.Na_2CO_3.2H_2O.$$

Sodium sesquicarbonate has, heretofore, been artificially prepared by carbonating an aqueous solution of sodium carbonate. This invention provides a process for the direct production of sodium sesquicarbonate from sodium bicarbonate. The invention includes an operation for the conversion of sodium bicarbonate to sodium sesquicarbonate, a combined operation for the production of sodium sesquicarbonate and the recovery of sodium bicarbonate, and a cyclic operation for the production of sodium sesquicarbonate.

According to the present invention, sodium bicarbonate is converted to sodium sesquicarbonate by subjecting the sodium bicarbonate to treatment with ammonia in the presence of an aqueous solution of sodium chloride, the ammonia being present in concentration less than that at which ammonia-containing salts such as sodium carbamate are precipitated. The ammonia should be substantially free from carbon dioxide if maximum conversion is to be secured. If a maximum conversion is to be secured, any carbon dioxide content of the ammonia should not exceed that corresponding to a molecular ratio $CO_2:NH_3$ of about 0.1. As this ratio increases the proportion of sodium bicarbonate converted to sodium sesquicarbonate decreases. Conversions short of maximum conversion can be effected when this ratio approximates as much as 0.25 or more. The aqueous solution of sodium chloride is with advantage substantially saturated with respect to sodium chloride. The maximum molecular ratio of sodium bicarbonate to ammonia in the reaction mixture approximates with advantage 1.1; this ratio may have any lesser value. The precipitated sodium sesquicarbonate may be separated from the mother liquor in any convenient manner, as by filtration or by decantation or by centrifuging.

In a mixture of ammonia and carbon dioxide, a molecular ratio $CO_2:NH_3$ of 0.1 corresponds, approximately, to a mixture containing about 1 part by weight of carbon dioxide per 4 parts by weight of ammonia or 10% by volume of carbon dioxide on the ammonia.

The invention will be illustrated by the following specific examples:

I. Ammonia gas, substantially free from carbon dioxide, is passed into an aqueous solution of sodium chloride, substantially saturated with respect to sodium chloride, until the molecular ratio $NH_3:NaCl$ approximates 1:1. To this ammoniacal brine, 91.5 parts (by weight) of sodium bicarbonate are added for every 17 parts of ammonia present, the temperature of the reaction mixture being maintained at about 30° C. The precipitated sodium sesquicarbonate is separated from the mother liquor by filtration, washed free from chlorides and dried, for example, in a current of warm air. About 56% of the total sodium present is recovered as sodium sesquicarbonate.

The reaction mixture may be maintained at temperatures higher or lower than 30° C. The range 20°–70° C. is in general advantageous. A small part of the sodium chloride as well as substantially all of the sodium bicarbonate is converted to sodium sesquicarbonate.

II. 20.8 parts of ammonia and 114 parts of sodium bicarbonate are added to a solution of 58.5 parts of sodium chloride in 180 parts of water, the temperature of the reaction mixture being maintained at about 30° C. The precipitated sodium sesquicarbonate is separated from the mother liquor by filtration, washed free from chlorides and dried, for example, in a current of warm air. About 60.3% of the total sodium present is recovered as sodium sesquicarbonate.

According to the present invention, the mother liquor, from which the precipitated sodium sesquicarbonate has been separated, is subjected to further treatment for the recovery of sodium bicarbonate. Part or all of the sodium bicarbonate so recovered may be supplied, cyclically, to the reaction producing the sodium sesquicarbonate. This recovery of sodium bicarbonate from the mother liquor is accomplished by carbonating the mother liquor, with carbon dioxide gas from any convenient source, to precipitate sodium bicarbonate, as in the conventional ammonia-soda process, and the sodium bicarbonate so precipitated is separated from the carbonated mother liquor. This separation may be effected in any convenient manner, as by filtration or by centrifuging. This mother liquor from which the sodium bicarbonate has been separated may be subjected to conventional treatment for the recovery of ammonia and carbon dioxide therefrom. It is advantageous, however, to carry out the recovery operation so as to secure the ammonia to be used in the reaction producing the sodium sesquicarbonate of minimum carbon dioxide content. In the combined operation, it is advantageous to adjust the molecular proportion of ammonia to sodium chloride to maintain a ratio of $NH_3:NH_3+Cl$ in the mother liquor from which the sodium sesquicarbonate is separated between about 0.4 and 0.6, best about 0.55, if the maximum recovery of sodium bicarbonate is to be secured. Also, in the combined operation, it is particularly advantageous to maintain a molecular ratio $CO_2:NH_3$ not exceeding about 0.1.

The accompanying drawing illustrates, as a flow sheet, one operation embodying the invention. Referring to the accompanying drawing, sodium chloride brine and ammonia gas are supplied to the absorber, the resulting ammoniacal brine together with crude sodium bicarbonate is supplied to the converter, the sodium sesquicarbonate produced by the reaction in the converter is separated in the first filter, the mother liquor from the first filter is carbonated in the carbonator, the sodium bicarbonate produced by the reaction in the carbonator is separated in the second filter and the mother liquor from the second filter is supplied to the decarbonator and lime still for the recovery of carbon dioxide and ammonia. All or part of the crude sodium bicarbonate separated in the second filter may be returned to the converter. The carbon dioxide recovered in the decarbonator, which may be contaminated with some ammonia, may be returned to the carbonator. The ammonia recovered in the lime still, substantially free from carbon dioxide, may be returned to the absorber. Additional quantities of carbon dioxide and ammonia are supplied to the carbonator and the absorber, respectively, as required.

In one aspect, the present invention provides a combined operation embodying the conventional ammonia-soda process and a novel step interposed between the conventional saturation of a sodium chloride brine with ammonia and the conventional carbonation of the ammoniacal sodium chloride brine for the production of sodium sesquicarbonate.

We claim:

1. In the conversion of sodium bicarbonate to sodium sesquicarbonate, the improvement which comprises subjecting the bicarbonate to treatment with ammonia in the presence of an aqueous solution of sodium chloride and thereby precipitating sodium sesquicarbonate.

2. In the conversion of sodium bicarbonate to sodium sesquicarbonate, the improvement which comprises subjecting the bicarbonate to treatment with ammonia substantially free from carbon dioxide in the presence of an aqueous solution of sodium chloride and thereby precipitating sodium sesquicarbonate.

3. In the conversion of sodium bicarbonate to sodium sesquicarbonate, the improvement which comprises subjecting the bicarbonate to treatment with ammonia in the presence of an aqueous solution substantially saturated with respect to sodium chloride, the molecular ratio of sodium bicarbonate to ammonia not exceeding about 1.1, and thereby precipitating sodium sesquicarbonate.

4. In the production of sodium sesquicarbonate, the improvement which comprises subjecting sodium bicarbonate to treatment with ammonia in the presence of an aqueous solution of sodium chloride, separating the sodium sesquicarbonate thereby precipitated from the mother liquor, carbonating the mother liquor and separating the sodium bicarbonate thereby precipitated.

5. In the production of sodium sesquicarbonate, the improvement which comprises subjecting sodium bicarbonate to treatment with ammonia in the presence of an aqueous solution of sodium chloride, separating the sodium sesquicarbonate thereby precipitated from the mother liquor, carbonating the mother liquor, separating the sodium bicarbonate thereby precipitated and supplying sodium bicarbonate so separated to said treatment.

GEORGE LEWIS CUNNINGHAM.
ROBERT B. MacMULLIN.